Jan. 11, 1927.　　　　　　　　　　　　　　　　　　　1,614,219
R. A. WARNER
METHOD AND APPARATUS FOR MEASURING VOLT AMPERES
IN AN ALTERNATING CURRENT CIRCUIT
Filed Dec. 18, 1924

Inventor
Russell A. Warner
by
His Attorney

Patented Jan. 11, 1927.

1,614,219

UNITED STATES PATENT OFFICE

RUSSELL A. WARNER, OF SCHENECTADY, NEW YORK, ASSIGNOR TO GENERAL ELECTRIC COMPANY, A CORPORATION OF NEW YORK.

METHOD AND APPARATUS FOR MEASURING VOLT AMPERES IN AN ALTERNATING-CURRENT CIRCUIT.

Application filed December 18, 1924. Serial No. 756,802.

My invention relates to a method of and apparatus for measuring the volt amperes of an alternating current circuit.

In alternating current power installations where the power factor of the load varies considerably, it sometimes becomes desirable to obtain a measurement of the volt amperes as distinguished from the watts. The measurement of volt amperes under such conditions is complicated due to the continuously varying phase angle between the current and voltage. It is conceivable that if we rectify both the current and voltage of an alternating current circuit, we can obtain a measurement of the volt amperes by means of an ordinary direct current wattmeter and thus avoid all difficulties of variations in the phase angle between the current and voltage of the alternating current circuit. In accordance with my invention, the problem is simplified by rectifying only one of these variable quantities, varying a direct current derived from the rectification in accordance with the other variable quantity and then measuring the resultant current by an ordinary direct current ammeter or ampere hour meter calibrated to indicate or register alternating current volt amperes. This method also avoids errors due to unbalanced phases and variations in frequency. In carrying my invention into effect, I prefer to rectify the alternating current voltage since this quantity is ordinarily much more constant than the current and the rectifying apparatus therefore may be of simple design.

The features of my invention which are believed to be novel and patentable will be pointed out in the claims appended hereto. For a better understanding of my invention, reference is made in the following description to the accompanying drawing, in which Fig. 1 illustrates one modification of my invention as applied to the measurement of volt amperes of a polyphase circuit; and Fig. 2 illustrates another modification as used to obtain a measurement of the volt amperes of a single phase circuit.

Figure 1:
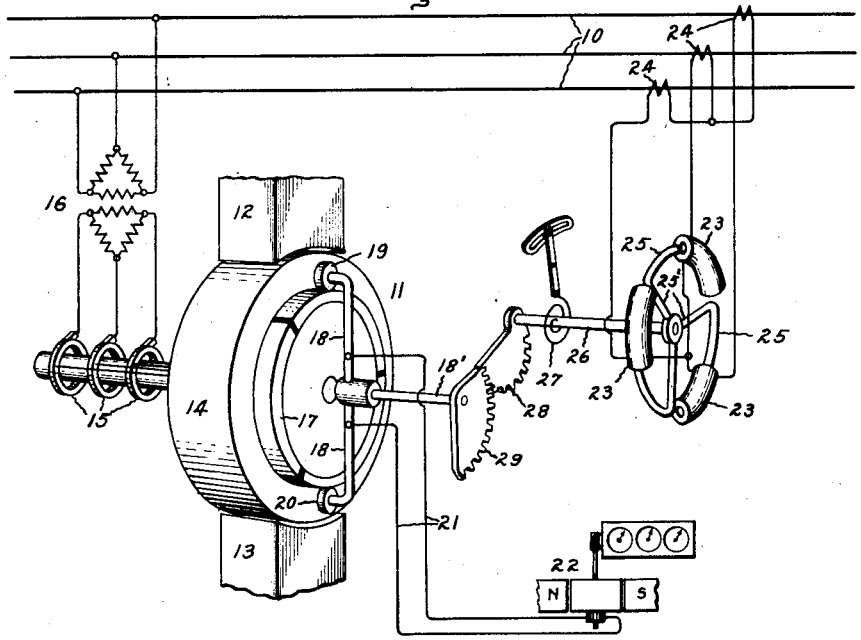
Figure 2:
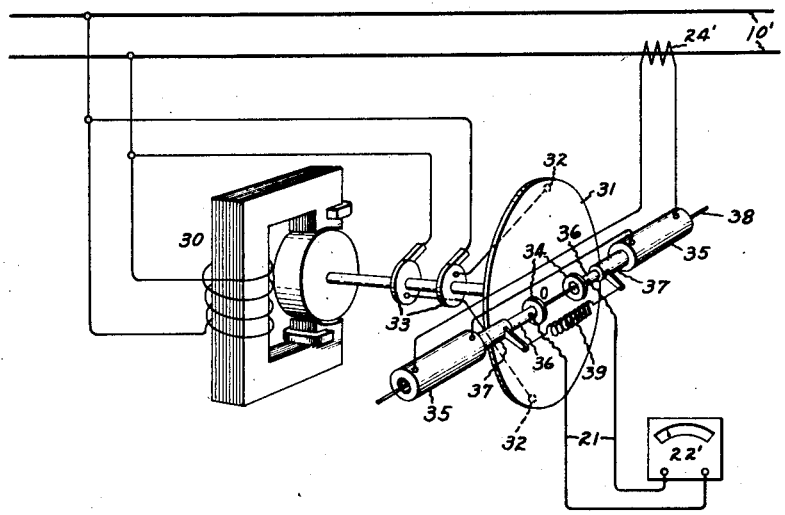

In Fig. 1, 10 represents a three-phase power circuit. 11 represents a synchronous rotary converter having a rectifying commutator for rectifying the alternating current voltage. Any type of rectifier might be used, but I prefer to use a mechanical rectifier as represented in the drawing and thus avoid all difficulties due to starting. The rectifying apparatus here represented consists of a small synchronous converter having stationary field magnets indicated at 12 and 13 and a rotary armature 14. The slip rings 15 are connected to the various phases of the alternating current power circuit through a potential transformer 16 where that is desirable. The commutator 17 need not necessarily have any more segments than the number of alternating current phases. The converter will preferably be of a self-starting type. With this arrangement, it will be evident that we may take direct current from the commutator, the voltage of which will be proportional to the alternating current voltage. The brush rigging consists of the brushes 19 and 20 and the brush holder 18 which is rotatable with a shaft 18'. These brushes may be small wheels which rotate upon the commutator surface in order that it require a minimum of energy to shift them from one position to another. The brushes are properly insulated and electrically connected by leads 21 to a direct current ammeter 22 here represented as of the integrating type.

In order to have the current in the ammeter circuit proportional to the product of the voltage and current in the alternating current circuit, I provide means responsive to the alternating current line current for shifting the brushes 19 and 20 in such a way that when the alternating current line current is zero, the brushes 19 and 20 will bridge the commutator at points of equal average potential and as the alternating current line current increases, the brushes will be shifted toward positions having a maximum voltage difference. Thus, when the alternating current line current is a maximum, the brushes will take the position represented and as the current decreases to zero, the brushes will be shifted through an angle of 90 degrees. In the modification shown, I provide three sector shaped solenoid coils 23 connected in star to three current transformers 24 one in each phase of the three-phase line. The core pieces 25 of the solenoids are sector shaped and are arranged on a spider 25' secured to a shaft 26. When the current is zero, the shaft 26 is rotated to bring the core pieces out of the coils by means of a spring 27 which is adjusted to make the rotative position of the shaft 26 proportional to the alternating current line current through the operating range. Shaft 26 is geared to the brush shifting shaft 18 by means of gear sectors 28 and 29 and these sectors are shaped so as to make the voltage across the brushes 19 and 20 directly proportional to alternating current line current for a constant alternating current line voltage.

It will now be evident that the voltage across the brushes 19 and 20 for a given brush position will be proportional to the average alternating current line voltage and the effective position of the brushes will be proportional to the average alternating current line current so that the brush voltage and consequently the current in the constant resistance ammeter circuit 21 will be directly proportional to the volt amperes of the alternating current circuit and this is true for unbalanced as well as balanced conditions and at all power factors of the alternating current circuit. The ammeter 22 may then be calibrated to register alternating current volt amperes. It is not essential that the coils 23 be connected in star as any other well known connection which will make the action of the solenoid device proportional to the average alternating current line current may be used.

In Fig. 2, I have represented a modification of my invention where the same measuring principle is carried out by slightly different apparatus. In Fig. 2 the rectifier is driven by a self-starting synchronous motor represented at 30. A disc 31 of material having considerable resistance is mounted on the shaft of the motor. This disc is connected at points 32 near its periphery through the slip rings 33 to the alternating current line 10′ which in this case is single phase and consequently the points 32 are diametrically opposite so as to provide a symmetrical voltage gradient across the disc. When this disc is rotated in synchronism with the alternating current circuit by the motor 30, there will be a fixed diameter across which there will exist a maximum direct current voltage which is proportional to the alternating current voltage. This diameter is in line with the connections 32—32 when the voltage wave is a maximum. Ordinarily it will not be in line with the field pole pieces of this type of motor since the motor flux lags behind the voltage wave. The exact position of this diameter with respect to the motor field poles can be readily determined and it will remain fixed for any given apparatus as thus arranged. On this diameter I have represented a pair of rotatable disc brushes 34 bearing against the face of the disc 31 and arranged to be moved from the center of the disc toward the periphery by means of solenoids 35 which are connected in series with a current transformer 24′ in the line 10′. The brushes are rotatably mounted on sleeves 36 and the sleeves are secured to the core pieces 37 of the solenoids. The core pieces and sleeves have a central opening through which a stationary guide rod 38 extends. A spring 39 keeps the two movable brush holders together with the brushes in contact with each other at the center of the disc when no current flows in the solenoids. As the current increases, the brushes are moved apart across the effective diameter of the disc toward its periphery. The two brushes are suitably connected by leads 21 to a direct current instrument 22′ represented as being of the indicating type. It may be a direct current voltmeter or a high resistance ammeter calibrated with the apparatus to read alternating current volt amperes.

It will now be seen that for any given brush position other than the center position, the alternating current voltage across the brushes is proportional to the alternating current line voltage and that for any given alternating current voltage, the direct current voltage across the brushes is proportional to the alternating current line current. Consequently, the meter indication will be proportional to the alternating current volt amperes. When the alternating current is zero, the brushes are at equal potential and no current will flow in the meter circuit.

It will be evident that either of the modifications shown in Figs. 1 and 2 may be adapted to either single or polyphase circuits and that the measurements will be independent of variations in power factor, frequency or phase balance.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. The method of obtaining a direct current which is proportional to the volt amperes of an alternating current circuit which consists in rectifying one of the said quantities of the alternating current circuit to obtain a direct current voltage proportional thereto and varying a direct current derived from said direct current voltage in proportion to the other of said quantities.

2. The method of obtaining a measurement proportional to the product of the volts and amperes of an alternating current circuit which consists in rectifying one of said quantities to obtain a direct current voltage proportional thereto, varying a direct current derived from said direct current voltage in proportion to the other quantity and measuring the resultant direct current.

3. The method of obtaining a measurement of the volt amperes of an alternating current circuit which consists in rectifying the alternating current voltage to obtain a direct current proportional thereto, varying a direct current derived from said direct current voltage in proportion to the current of said alternating current circuit, and measuring the resultant direct current.

4. The method of obtaining a measurement proportional to the volt amperes of a polyphase alternating current circuit which consists in rectifying the alternating current voltage waves thereof to obtain a direct current voltage proportional to the average alternating current voltage, varying a direct current derived from said direct current voltage in proportion to the average current of said polyphase circuit and measuring the resultant direct current.

5. Apparatus for measuring the volt amperes of an alternating current circuit comprising a rectifier connected and arranged to rectify one of said variables, a direct current meter supplied by the direct current end of said rectifier and means responsive to the other variable of said alternating current circuit for varying the current supplied to said meter.

6. Apparatus for measuring the volt amperes of an alternating current circuit comprising a rectifier connected and arranged to rectify the voltage of said circuit, a direct current meter supplied by the direct current end of said rectifier, and means responsive to the current of said alternating current circuit for varying the current supplied to said meter.

7. Apparatus for measuring the volt amperes of an alternating current circuit comprising a mechanical rectifier connected and arranged to rectify one of the variables of said alternating current circuit, direct current brushes for said rectifier, a direct current meter supplied from said brushes and means responsive to the other variable of said alternating current circuit for shifting the brushes of said rectifier.

8. Apparatus for obtaining a direct current voltage proportional to the volt amperes of an alternating current circuit comprising a mechanical rectifier driven from said circuit and arranged to rectify the voltage of said circuit, direct current brushes for said rectifier and means responsive to the current of said alternating current circuit for shifting said brushes from a position of zero voltage difference when the alternating current is zero toward a position of maximum voltage difference when the alternating current is a maximum.

9. Apparatus for obtaining a direct current voltage proportional to the volt amperes of an alternating current circuit comprising a rectifying commutator, means for driving said commutator in synchronism with the frequency of the alternating current circuit, said commutator being supplied from the alternating current circuit, direct current brushes bearing upon said commutator and means responsive to the current of said alternating current circuit for varying the position of said brushes, said means being adjusted to set the brushes at a position of zero potential difference on said commutator when the alternating current line current is zero.

10. Apparatus for obtaining a direct current voltage proportional to the volt amperes in an alternating current circuit comprising a disc of resistance material having points adjacent its periphery symmetrically connected to the phases of said alternating current circuit, means for rotating said disc in synchronism with the frequency of said alternating current circuit, brushes bearing against said disc and arranged to be moved in opposite directions from the center of said disc towards the periphery along a stationary axis, means responsive to the current in said alternating current circuit for so moving said brushes, and means for returning said brushes to the center of the disc when the alternating current line current is zero.

In witness whereof, I have hereunto set my hand this 17th day of December 1924.

RUSSELL A. WARNER.